May 14, 1963  L. W. DILGARD  3,089,580
CONVEYOR DEVICE
Filed May 23, 1960
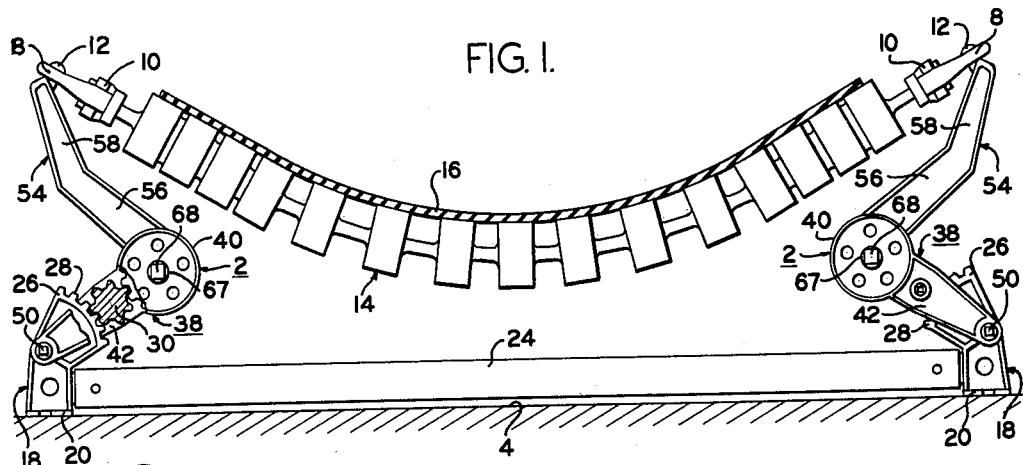
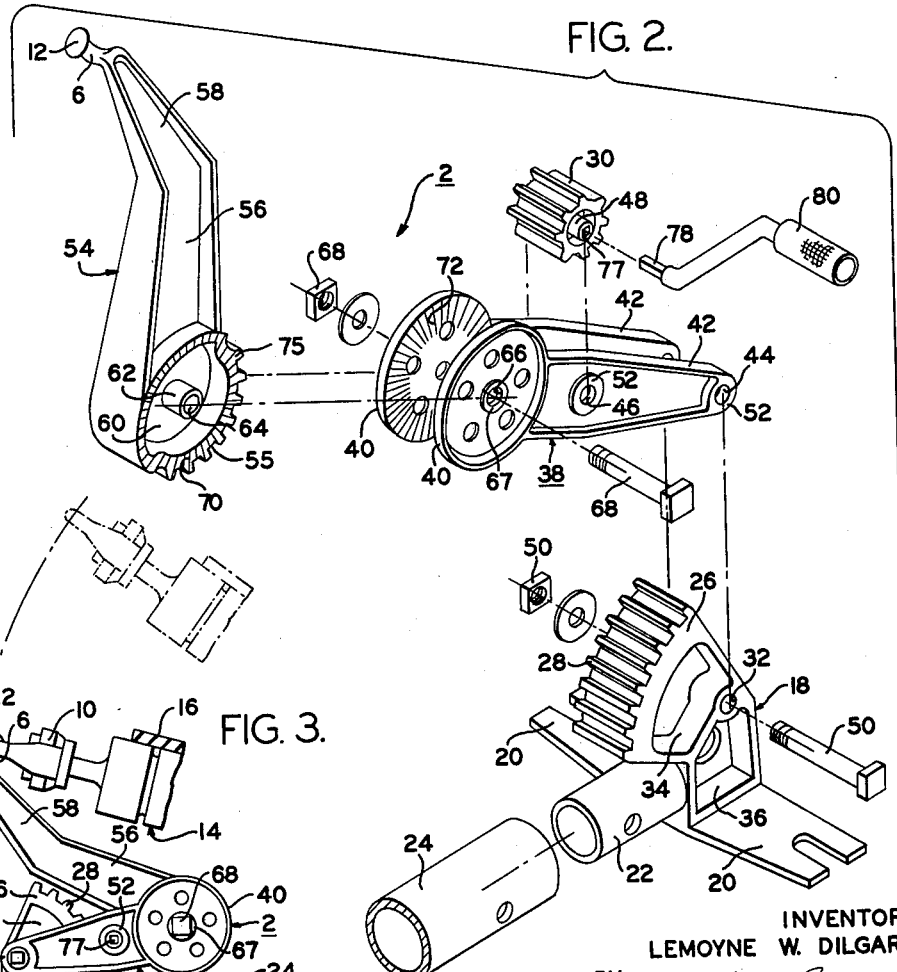
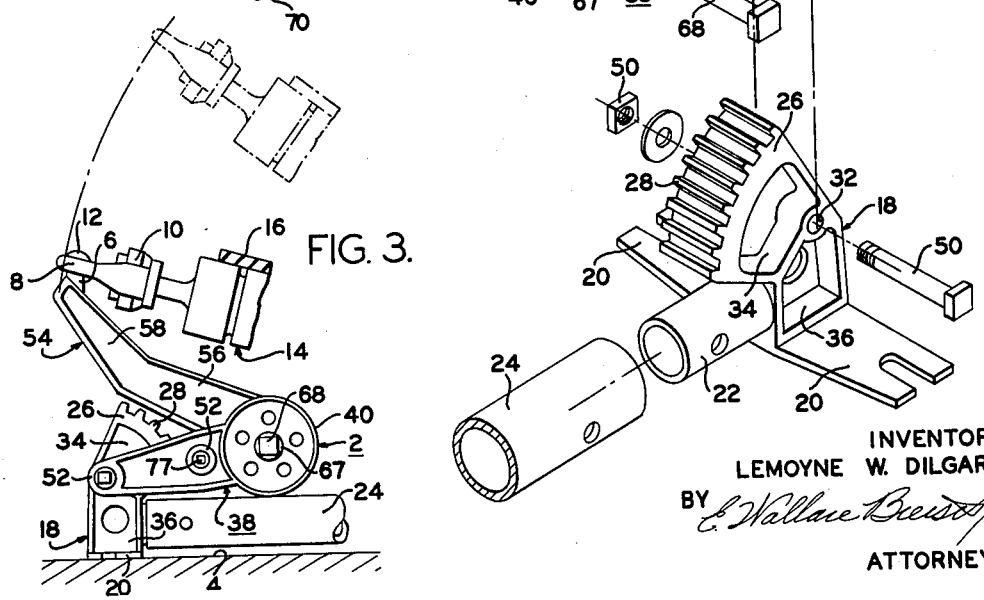
INVENTOR
LEMOYNE W. DILGARD
BY
ATTORNEY

3,089,580
CONVEYOR DEVICE
Lemoyne W. Dilgard, Dover, Ohio, assignor to Joy Manufacturing Company, Pittsburgh, Pa., a corporation of Pennsylvania
Filed May 23, 1960, Ser. No. 31,064
9 Claims. (Cl. 198—192)

This invention relates to a conveyor device and more particularly to an adjustable conveyor device for providing underlying support for a movable belt conveyor.

At the present time it is well known to provide conveyor devices for elongated movable belt conveyors comprising longitudinally spaced stands which extend laterally beneath the conveyor belt and which support rotatable idlers therebetween in the form of a catenary for providing underlying support for the movable belt. Although there are some known devices for permitting adjustment of the catenary of the rotatable means, in general rigid support stands have been provided for the rotatable idler. In the known devices for adjusting the catenary of the idler the means for obtaining such adjustment has either required reassembly of the supporting device or has not permitted adjustment of the idler through any substantial angle so that the catenary of the idler does not vary to any substantial degree. In many conveyor installations it is quite desirable that the idler have a catenary which is adjustable over a wide range in order to properly support the conveyor belt under all load conditions. In addition, it is desirable that any support stand be constructed so that it may readily be assembled and thereafter readily disassembled so that the stand may be used in another location.

Accordingly, one object of this invention is to provide a new and improved conveyor device which supports an elongated flexible idler member in the form of a catenary which catenary can be readily varied.

Another object of this invention is to provide a new and improved conveyor device which supports an elongated flexible idler member in the form of a caatnary which catenary can be readily varied while the idler member is supporting a movable belt conveyor during the period the belt conveyor is transporting material.

Still another object of this invention is to provide a new and improved conveyor device which supports an elongated flexible idler member in the form of a catenary which catenary can be readily varied throughout a wide range of catenary angles.

A still further object of this invention is to provide a new and improved conveyor device which has articulated support means at each side thereof for supporting an elongated flexible idler member in the form of a catenary which catenary can be readily varied throughout a wide range of catenary angles without any substantial change in height of the center of the catenary curve of the idler relative to the surface over which the idler is supported.

A more specific object of this invention is to provide a new and improved conveyor device which has double pivot support means at each side thereof for supporting an elongated flexible idler in the form of a catenary.

Another more specific object of this invention is to provide a new and improved conveyor device which has double pivot support means at each side thereof for supporting an elongated flexible idler in the form of a catenary which pivot means may be locked in a wide range of relative positions.

Still another more specific object of this invention is to provide a new and improved conveyor device which supports an elongated flexible idler member in the form of a catenary and a support for the conveyor device which can readily be assembled and disassembled.

A further specific object of this invention is to provide a new and improved conveyor device which has double pivot support means at each side thereof for supporting an elongated flexible idler in the form of a catenary which employs a rack and idler gear for adjusting the catenary of the idler.

These and other objects of the invention will become more apparent upon consideration of the following detailed description of a preferred embodiment thereof, when taken in conjunction with the following drawings, in which:

FIG. 1 is a front elevational view of a conveyor device constructed in accordance with the principles of this invention with a portion thereof broken away to more clearly show the structure thereof, FIG. 2 is an enlarged exploded perspective view of a portion of the conveyor device as shown in FIG. 1, and FIG. 3 is a front elevational view of a side portion of the conveyor device as shown in FIG. 1 with the parts thereof being shown in other relative positions.

Referring to FIGS. 1 and 2, a conveyor device constructed in accordance with the principles of this invention comprises a pair of adjustable side supports 2 which extend generally upwardly above a surface 4 over which it is desired to convey material. The upper end of each support 2 is provided with an integral cylindrical projection 6, which projections 6 extend laterally inwardly toward each other and upwardly from the surface 4 to provide posts for supporting reversibly bent yoke portions 8 of bails 10, respectively. The outer end of each projection 6 is provided with an integral enlarged head portion 12 to prevent the yoke portion 8 cooperable therewith from sliding upwardly off the projections 6 during operation of the conveyor device as hereinafter described. The bails 10 suitably support bearing means therein (not shown) which bearing means suitably rotatably support an elongated flexible idler 14 therebetween so that the idler 14 provides lateral underlying support for an elongated movable flexible conveyor belt 16 traveling thereover. Inasmuch as the bail 10, the idler 14 and the cooperation therebetween whereby the idler 14 is rotatable does not constitute a part of this invention, further description of these components is not believed to be necessary. For a more particular showing and description of one satisfactory construction for the idler 14 reference is made herein to Patent No. 2,876,890 and for a more particular description and showing of the bail 10 and the cooperation with the idler 14 reference is made herein to copending application Serial No. 849,585, filed October 29, 1959, entitled Conveyor Apparatus, which application has been assigned to the same assignee as this invention. It will be noted that due to the free pivotable movement of the bails 10 on the projections 6, respectively, as more particularly pointed out in the above identified copending application that the bails 10 are particularly suited for use with this invention.

As shown in FIG. 2 each side support 2 has a formed base having an upwardly extending portion 18 and a pair of opposed foot portions 20 extending laterally outwardly from the opposite sides of the portion 18. The foot portions 20 are engageable with the surface 4 to prevent the side supports 2 from being tipped over in a direction parallel to the direction of movement of the belt 16, that is, laterally of the idler 14. The opposed portions of the upwardly extending portions 18 extend upwardly from the surface 4 and are provided with integral tubular portions 22 which extend outwardly of the portions 18 and also extend inwardly towards each other below the idler 14 upwardly adjacent the surface 4. With such structure the side supports 2 are readily laterally spaced opposite each other by means of elongated pipes 24 which have an internal diameter so as to be closely received over the outer surfaces of the tubular portions 22, respectively. Thereafter, if desired, the pipe 24 may be secured to the tubular portions 22 in any suitable manner such as by being bolted thereto or providing a drift pin which extends laterally through aligned openings therein. For the purposes of this invention it is quite desirable that the pipe 24 be of a standard size as is commonly stocked by industry and accordingly the outside diameter of the tubular portions 22 is selected with reference to the dimensions of a standard pipe size. With such structure it is not necessary to provide the tubular pipes 24 to a customer since standard pipe can be immediately purchased in any locality and can be cut to any desired length. Thus, any desired lateral spacing of the side supports 2 can be readily achieved by using various lengths of pipe 24. If desired, the pipe 24 can be used to support a return run 15 of conveyor belt such that the return run 15 slides thereover; however, the pipe 24 need not be employed for such purposes or if desired the pipe 24 can be suitably rotatably supported for such purposes.

Each upwardly extending portion 18 is also provided with an integral rack support portion 26 which extends angularly upwardly and inwardly above the tubular portion 22 with the inwardly facing surface thereof being provided with a suitable gear segment comprising spaced gear teeth 28. As shown, the upwardly extending portions 18 are provided with an opening 32 extending laterally therethrough which is located above and rearwardly of the tubular portion 22. As will become more apparent hereinafter, the teeth 28 are spaced along an arc with the center thereof corresponding to the center of the opening 32. A toothed pinion or idler gear 30 is provided which is cooperable with the gear teeth 28 to travel around the center of the opening 32 in an arc. Inasmuch as the forming of toothed elements such as teeth 28 and idler gear 30 is well known, further description thereof is not believed to be necessary; however, it will be noted that rolling cylindrical contact is obtained between the teeth 28 and the idler gear 30. For the purpose of reducing weight of the portion 18 suitable openings 34 and 36 may be provided in the sides thereof which do not interfere with the function or strength thereof.

Again referring to FIG. 2, a pair of formed pivot arms 38 are provided which comprise a circular plate portion 40 having an elongated arm portion 42 extending radially therefrom. Each arm portion 42 is provided with an opening 44 adjacent its outer end and an opening 46 outwardly adjacent the plate portion 40 which openings 44 and 46 extend laterally therethrough. In use the arms 38 are laterally spaced from each other and the openings 46 are provided to rotatively support the idler gear 30 therebetween. Accordingly, the idler gear 30 is provided with central axially outwardly extending shaft portions 48 (only one of which is shown) which are suitably received in the openings 46 to permit the idler gear 30 to freely rotate between the arms 38. Shaft portion 48 is provided at either end with a longitudinally extending square recess 77 for a purpose to be hereinafter explained. In assembling the conveyor device the spaced arms 38 with the idler gear 30 located therebetween are slipped past the sides of the rack portion 26 and the openings 44 are aligned with the opposite ends of the openings 32 in the portion 18. Thereafter suitable means such as a bolt and nut assembly 50 is inserted through the aligned openings 44 and 32 to pivotally connect and support the arms 38 with relation to the portion 18 of the base. In operation the teeth of the idler gear 30 mesh with the gear teeth 28 and accordingly the openings 44 and 46 are spaced longitudinally from each other to properly support the idler gear 30 for such rotation. If desired, annular bosses 52 may be provided on the arm portions 42 which extend outwardly from the outer sides thereof in alignment with the openings 46 and 44 to provide additional bearing surfaces for the shaft portions 48 and the bolt and nut assembly 50, respectively.

With the assembly as heretofore described the plate portions 40 of arms 38 are laterally spaced from each other for the purpose of receiving the lower end of an elongated pivot arm 54 therebetween. The arm 54 may be of any suitable cross sectional form and is provided with the projection 6 and head 12 at its outer end as previously described. As shown, the lower end portion 55 of each arm 54 is generally tubular in form with an arm portion 56 extending radially therefrom. The upper end of the arm portion 56 terminates into another arm portion 58 which is inclined with reference to the arm portion 56 as hereinafter described. Although the lower end 55 of the arm 54 is generally tubular, it will be noted that it is provided with a flange 60 extending centrally laterally thereacross to provide a center web therein. As shown, the flange 60 is provided with a central opening 64 extending laterally therethrough and tubular shaft portions 62 extending laterally outwardly from opposite sides of the flange 60, respectively, in alignment with the central opening therein. In addition, the shaft portions 62 and the central opening in the flange 60 are the same or substantially the same size to permit the arm 54 to be rotatively supported between the plate portions 40 of the arms 38.

In order to clamp the lower portions 55 of the arms 54 between the plate portions 40 of arms 38 each plate portion 40 is provided with a central opening 66 extending laterally therethrough which openings 66 are alignable with the central opening in the lower portion 55 upon being placed therebetween. If desired, suitable annular bosses 67 may be provided around the outer edges of the openings 66. Thereafter such clamping is effected in any suitable manner such as by a suitable bolt and nut assembly 68. If desired, in order to facilitate preventing the arm 54 from rotating with respect to the side plates 40 suitable serrations 70 and 72 may be provided on the engageable surfaces of the lower portion 55 and the opposed surfaces of the plate portions 40, respectively, which serrations 70 and 72 engage each other upon the clamping of the arm 54 between the plate portions 40 by the bolt and nut assembly 68 to prevent rotational movement between the arms 38 and 54. In order to obtain the desired rotation of the arm 54 as hereinafter described, the arcuate outer surface of the lower portion 55 facing the idler gear 30 is provided with a suitable gear segment comprising a plurality of circumferentially spaced gear teeth 75 extending axially thereacross. The gear teeth 75 are of any suitable form as is well known in the art whereby they have rolling cylindrical contact with the teeth of the idler gear 30 when all components of the side supports 2 are assemblied as described.

As heretofore indicated the arm portions 58 and 56 are inclined with reference to each other in order to obtain the desired support of the idler 14. With reference to the showing of the arm 54 in FIG. 2, it will be noted that when the arm portion 56 extends upwardly, the arm portion 58 extends angularly upwardly from the arm portion 56. In addition the projection 8 extends outwardly from the arm portion 58 in the same direction as the arm portion 58 extends from the arm portion 56; however, the angle of the projection 8 with the horizontal is substantially less than the angle of the arm portion 58 with the horizontal. In use, see FIG. 1, it will be noted that the arm portions 58 of the opposed side portions 2 extend vertically upwardly with a slight divergency with respect to each other so that the projections 6 extend slightly inwardly towards each other at an upwardly inclined angle so that the bails 10 are properly supported for both vertical pivotal movement and pivotable movement substantially about the center of the projections 6, respectively.

In order to permit ready adjustment of the pivot arms 38 and 54 relative to each other, the square recess 77 of the shaft portion of the idler gear 30 is engageable by the square end 78 of a suitable crank 80 whereby the idler gear 30 is rotatable, when desired, as hereinafter described. It will be realized however that various cooperable shapes and devices can be employed to rotate the idler gear 30.

The advantages of the above described structure are best realized by describing the physical steps of adjusting the catenary of the idler 14. Accordingly, for such description it will be initially assumed that the entire structure is assembled as described and the components are located in the relative positions as shown in FIG. 1. In such position, since the bails 10 are pivotably supported by the projections 6 and the idler 14 is flexible, the idler 14 will assume a catenary form between the side members 2. If desired, the catenary of the idler 14 may readily be varied by adjusting the relative position of either or both pairs of pivot arms 54 and 38 by loosening the securing means 50 and 68. In instances where the surface 4 is not level it may be desirable to elevate or lower only the pivot arms 54 and 38 of one side member 2 while leaving the other side member 2 stationary. Under these circumstances the securing means 50 and 68 are first released on one side member 2 so that the arm 38 is free to pivot about the center of the opening 32 on the shank of the bolt portion of the assembly 50 and the serrations 70 and 72 are separated so that the arm 54 may pivot about the center of the openings 66 in the arms 38 on the shank of the bolt portion of the assembly 68, respectively. After such release the end 78 of crank 80 is inserted into the recess 77 of idler gear 30 and the idler gear 30 rotated by hand in either a clockwise or counterclockwise direction. In view of the release of the pivot arms 38 and 54 and the engagement of the teeth of the idler gear 30 simultaneously with the gear teeth 28 on the base and the teeth 75 on the arm 54, such rotation of the idler gear 30, since the base of the side support 2 is stationary, causes the idler gear 30 to roll on the arcuate gear segment formed by the teeth 28 and at the same time rotate the arm 54 about the center of the openings 66. Thus, referring to FIG. 3 and the left side member 2 of FIG. 1, if the idler gear 30 is rotated in a clockwise manner the arm 38 will be lowered until it reaches the extreme lower position shown in full in FIG. 3 in which the plates 40 engage the upper portion of the pipe 24. If the idler gear 30 is rotated in a counterclockwise manner the arm 58 will be elevated from the lower position as shown in solid lines in FIG. 3 to an upper position such as that shown in dotted outline ing FIG. 3. Since gear tooth engagement is employed the outer end of the arm 54 will follow a definite arc as shown in the construction line of FIG. 3, the length of which is determined by the number of cooperable teeth 28 and 75 on the gear segments. Accordingly, a number of teeth 28 and 75 are selected to achieve the desired travel of the arms 38 and 54. Once a desired relative position between the arms 38 and 54 is achieved the securing means 50 and 68 are re-secured, as previously described, to provide a rigid side member 2. It will be realized that as the outer end of the arm 54 changes its position with respect to the surface 4 that the catenary of the idler 14 will be varied until the desired catenary is achieved.

In the known adjustable supports for varying the catenary of the idler, as the idler assumes a sharper catenary curve and accordingly a deeper trough, there is a proportional lowering of the idler relative to the surface on which it is supported both at the end portions where the idler is rotatably supported as well as in the center portion of the idler in some cases, and in other cases at least the center portion of the idler is lowered relative to the surface over which it is supported. With the present invention, however, it will be noted that as idler gear 30 is rotated counterclockwise and the arm 54 rotates clockwise in an arc about its pivot 68, a compound arcuate movement is imparted to the end portion or bail supporting projection 6 of arm 54 owing to the fact that idler gear 30 also engages gear teeth 28 of rack 26 causing arm 38 to rotate in a counterclockwise arc about its pivot 50. The gear ratio between rack 26, idler gear 30, and gear 75 is such that the compound arcuate movement imparted to the projection 6 on arm 54 provides for a sharper catenary curve in the idler suspended therefrom without any substantial change in height of the center portion of the idler 14 relative to the surface over which it is supported. Thus, once the proper clearance is established between the bottom of the center portion of idler 14 and the return run of the conveyor belt or any other obstacles which may be located thereunder, no further attention need be directed to such clearance during subsequent adjustments of the catenary of the idler.

Although as indicated the arm 54 follows a definite arcuate path it will be realized that such path is determined by the assembled relative position of the idler gear 30 to the arm 54. If desired, movement of the arm 54 along a different arcuate path can be obtained by changing the initial relative position between the arm 54 and the idler gear 30 and then assembling the side support 2 together. Although only the adjustment of one side support 2 has been described, it is obvious that both side supports 2 are adjustable in the same manner. Thus, it will be noted that this structure provides a simple and practical means for supporting a flexible idler so that its catenary can be readily adjusted. Since a counter force can be applied by hand to the crank 80 to prevent collapse of a side support 2 the catenary adjustment can be made while the belt 16 is carrying a full load.

It will be realized that there are various changes that may be made in the structure to achieve either simplicity of operation of a different catenary adjustment. Thus, the nuts of the bolt and nut assemblies 50 and 68 may be permanently secured to the portion 18 and portion 42 of arm 38, respectively, so that only the bolt is rotatable to release the clamping pressure. In addition various sizes of arms 38, idler gears 30 and gear segments can be provided to obtain various travels of the arms 54. Having described a preferred embodiment of this invention in accordance with the patent statutes, it is to be realized that modifications thereof may be made without departing from the broad spirit and scope of the invention. Accordingly it is respectfully requesed that this invention be interpreted as broadly as possible and be limited only by the appended claims.

What is claimed is:

1. In a conveyor device having an elongated flexible belt supported in the form of a catenary for conveying material over a surface, a support means comprising: a pair of laterally spaced linkages having lower, intermediate, and upper link portions; said link portions having only a fixed path of movement with respect to each other; respectively, extending above such a surface; said intermediate portions being mounted for arcuate movement relative to said lower portions; respectively; and said upper portions being mounted for arcuate movement relative to said intermediate portions respectively.

2. In a conveyor device having an elongated flexible belt supported in the form of a catenary for conveying material over a surface, a support means comprising: a pair of laterally spaced articulated means having a stationary lower, a movable intermediate, and a movable upper portion respectively, all of which portions extend above such a surface; adjusting means located in said intermediate movable portions respectively, in engagement with said upper and said lower portions for moving said intermediate and upper portions relative to said lower portions; said intermediate portions being mounted for arcuate movement relative to said lower portions respectively.

3. In a conveyor device having an elongated flexible belt supported in the form of a catenary for conveying material over a surface, a support means comprising: a pair of laterally spaced articulated means having lower, intermediate, and upper portions respectively, extending above such a surface; adjusting means located in said intermediate portions respectively, in engagement with said upper and said lower portions for moving said intermediate and said upper portions relative to said lower portions; said intermediate portions being mounted for arcuate movement relative to said lower portions respectively; and said upper portions being mounted for arcuate movement relative to said intermediate portions respectively.

4. In a conveyor device having an elongated flexible belt supported in the form of a catenary for conveying material over a surface, a support means comprising: a pair of laterally spaced articulated means having lower, intermediate and upper portions respectively, extending above such a surface; adjusting means located in said intermediate portions respectively, in engagement with said upper and said lower portions for moving said intermediate and said upper portions relative to said lower portions; said intermediate portions being mounted for arcuate movement relative to said lower portions respectively; said upper portions being mounted for arcuate movement relative to said intermediate portions; said adjusting means providing compound arcuate movement for varying the catenary curve of such a belt supported between said upper portions and simultaneously maintaining the height of the center portion of such a belt relative to such a surface constant.

5. A conveyor device comprising, a pair of spaced support means adapted to support a flexible idler suspended therebetween, each of said support means having a base portion and articulated portions, said articulated portions having only a fixed path of movement with respect to each other, one of said articulated means of each of said support means being pivotably mounted on said base portion, another of said articulated means of each of said support means being pivotably connected at one end thereof to said one of said articulated means, and having means on the other end thereof for supporting such an idler.

6. A conveyor device comprising, a pair of spaced support means adapted to support a flexible idler suspended therebetween, each of said support means having a base portion and articulated portions, one of said articulated means of each of said support means being pivotably mounted on said base portion thereof, the other of said articulated means of each of said support means being pivotably mounted at one end thereof in said one of said articulated means thereof, said other of said articulated means having a free end opposite from said one end which free end is adapted to support one end of such an idler suspended therefrom, and means for locking said articulated means to each other.

7. A conveyor device comprising, a pair of spaced support means adapted to support a flexible idler suspended therebetween, each of said support means having a base portion and articulated portions, one of said articulated portions of each of said support means having a serrated portion located at one end thereof, the other of said articulated portions of each of said support means having a serrated portion located at one end thereof in cooperative engagement with said first mentioned serrated portion, and means for securing said first mentioned serrated portion and said second mentioned serrated portion to each other for locking said articulated portions against movement relative to said base.

8. A conveyor device comprising, a pair of spaced support means adapted to support a flexible idler suspended therebetween, each of said support means having a base portion and articulated portions respectively, each of said support means having first gear sector means located on one of said articulated portions and second gear sector means located on said base portion thereof, and each of said support means having gear means located in the other of said articulated portions which gear means engages said first and second gear sector means to vary the catenary of such an idler and simultaneously maintain the relative position of the center portion of such an idler constant.

9. A conveyor device comprising: a pair of spaced support means adapted to support a flexible idler suspended therebetween; each of said support means having a lower base portion, an intermediate articulated portion, and an upper articulated portion; each of said support means having gear sector means located on said base portion thereof; each of said support means having gear means located in said intermediate articulated portion thereof; each of said support means having second gear sector means located at one end of said upper articulated portion thereof; said gear means engaging said first and second gear sector means to vary the catenary of such an idler and simultaneously maintain the relative position of the center portion of such an idler constant; and mounting means on said upper articulated portion of each of said support means located on the end thereof opposite said gear sector means for suspending such an idler therefrom.

References Cited in the file of this patent
UNITED STATES PATENTS

| | | |
|---|---|---|
| 909,833 | Vrooman | Jan. 12, 1909 |
| 1,255,659 | Stephens | Feb. 5, 1918 |
| 2,724,490 | Barnish | Nov. 22, 1955 |